United States Patent [19]

Kapich et al.

[11] 3,887,197

[45] June 3, 1975

[54] SEAL SYSTEM

[75] Inventors: Davorin D. Kapich, La Jolla; Glenn C. Thurston, Del Mar, both of Calif.

[73] Assignee: General Atomic Company, San Diego, Calif.

[22] Filed: Mar. 17, 1972

[21] Appl. No.: 235,570

[52] U.S. Cl. ................................................. 277/15
[51] Int. Cl. ............................................. F16j 15/40
[58] Field of Search .......................... 277/15, 16, 17

[56] References Cited
UNITED STATES PATENTS

| | | | |
|---|---|---|---|
| 1,728,268 | 9/1929 | Flanders | 277/15 |
| 2,820,652 | 1/1958 | Oechslin | 277/15 |
| 3,508,758 | 4/1970 | Strub | 277/15 |

*Primary Examiner*—William T. Dixson, Jr.
*Assistant Examiner*—Robert I. Smith
*Attorney, Agent, or Firm*—Fitch, Even, Tabin & Luedeka

[57] ABSTRACT

A seal system is described for a shaft which extends between two regions which are to be isolated. The seal includes a seal housing which defines an annular land facing on the shaft and which defines an annular labyrinth facing on the shaft. The housing also defines a collection cavity communicating with the spaces between the land and the shaft and between the labyrinth and the shaft. Fluids compatible with the fluids in each of the two regions to be isolated are introduced, respectively, to the space between the land and the shaft and to the space between the labyrinth and the shaft. These fluids are collected in the cavity and are removed therefrom.

2 Claims, 1 Drawing Figure

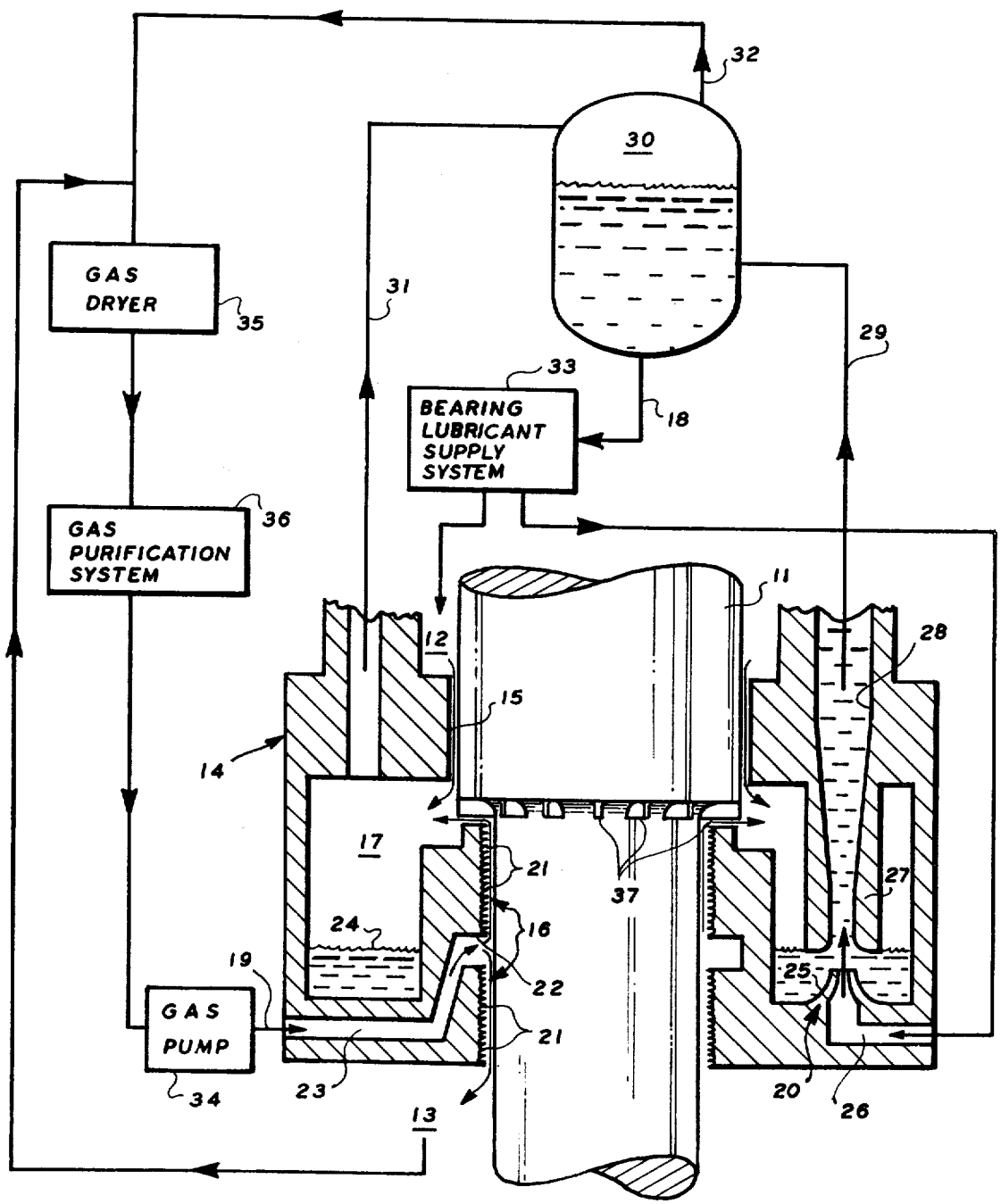

SEAL SYSTEM

This invention relates generally to sealing means and, more particularly, to a seal system for a shaft which extends between two regions containing different fluids which are to be isolated from each other.

The present invention is particularly useful in fluid circulators of the type shown and described in U.S. Pat. No. 3,520,640. The invention, however, is not limited to use in such a fluid circulator, but is applicable to any situation in which a shaft extends between two regions containing different fluids which are to be isolated from each other. Nevertheless, the invention is described herein particularly in connection with a fluid circulator of the type described in the aforementioned U.S. patent.

In the circulator described in the aforementioned U.S. patent, the fluid to be circulated is a gas coolant in a nuclear reactor, and the power for the circulator is derived by means of a turbine located within the primary containment vessel for the reactor. Under such circumstances, it is necessary to isolate the reactor coolant, such as helium or carbon dioxide, from the fluid used to drive the turbine, namely, steam or water. To make the lubrication system of the circulator more simple, water lubrication is used because it is compatible with the turbine driving fluid.

It may be observed that in circulator of the foregoing described type, a seal system is used to isolate the fluid in the cooling system of the reactor from the fluid in the turbine and lubrication system.

It is an object of the present invention to provide an improved shaft seal system.

Another object of the invention is to provide a seal for a shaft which extends between two regions containing fluids which require isolation from each other.

It is another object of the invention to provide a seal for a shaft which extends vertically between an upper region in which a liquid is located and a lower region in which a gas is located.

Other objects of the invention will become apparent to those skilled in the art from the following description taken in connection with the accompanying drawing wherein the sole FIGURE is a schematic full section view of a seal system constructed in accordance with the invention.

Very generally, the seal system of the invention is for a shaft 11 which extends between a first region 12 in which a fist fluid is present and a second region 13 in which a second fluid is present. The seal includes a seal housing 14 defining an annular land 15 and an annular labyrinth 16, both of which face the shaft. The land is spaced axially toward the first region from the labyrinth. The seal housing further defines a fluid collection cavity 17 communicating with the space between the land and the shaft and with the space between the labyrinth and the shaft. Means 18 are provided for introducing a fluid compatible with the first fluid into the space between the land and the shaft. Means 19 are provided for introducing a fluid compatible with the second fluid into the space between the labyrinth and the shaft. And means 20 are provided for removing fluids from the cavity.

More particularly, the shaft 11 in the drawing comprises the drive shaft of a helium circulator for use in a gas cooled nuclear reactor in which the primary coolant is helium. The helium is present in the region 13 and the shaft 11 drives a suitable helium circulator, not shown, in the region 12 for circulating the coolant.

The shaft 11 is driven by a steam turbine and is supported by high pressure water lubricated bearings, not shown, in the region 12. The unillustrated water bearings also isolate the region 12 from the steam in the steam turbine. Thus, water is present in the region 12. The shaft and the seal housing 14 may be suitably enclosed in a circulator housing, not shown, positioned within the primary enclosure, not shown, of the nuclear reactor. The annular land 15 provides a rotary seal between the region 12 and the cavity 17.

The seal housing 14 is positioned surrounding the shaft 11 between the regions 12 and 13. The seal housing 14 defines the annular land 15 which faces on the shaft 11. The land 15 is of a diameter in relation to the diameter of the shaft so that a narrow region or space is defined between the land and the shaft of sufficient size as to maintain a fluid barrier when fluid is introduced thereto under sufficient pressure. This barrier exists when the shaft 11 is rotating or when the shaft 11 is stationary. Thus water introduced to the space between the land 15 and the shaft 11 under sufficient pressure provides the necessary fluid barrier.

The shaft 11 is of stepped or reduced diameter toward the region 13 from the region bordering on the land 15. In the reduced section of the shaft, the housing 14 defines an annular labyrinth 16. The labyrinth is formed in accordance with known techniques to provide a plurality of annular grooves 21 which extend along the shaft, with the material between the annular grooves 21 lying closely adjacent the surface of the shaft to restrict passage of fluids therealong.

An annular recess 22 is defined by the housing 14 intermediate the ends of the labyrinth 16. A fluid injection passage 23 is defined by the housing communicating from outside the seal housing 14 with the annular recess 22. A fluid compatible with the fluid in the region 13 is introduced under pressure to the passage 23. This fluid flows into the annular recess 22 as shown by the arrows, and then flows in each direction along the labyrinth 16 as shown by the arrows. In the case of a helium cooled nuclear reactor, the fluid introduced to the passage 23 is helium, and thus the fluid entering the region 13 through the labyrinth 21 is fully compatible with the coolant present in the region.

The seal housing 14 also defines the annular cavity 17 which extends around the shaft and which is open to the shaft in the region between the land 15 and the labyrinth 16. Accordingly, fluid introduced to the space between the land 15 and the shaft and fluid introduced to the space between the labyrinth 16 and the shaft flow axially along the shaft toward each other and then flow into the cavity 17. In the case of the specifically described embodiment, a mixture of water and helium is present in the cavity 17. The level of water in the cavity 17 during normal operation of the seal is indicated at 24, and is maintained thereat by the action of the nozzle 25 and passages 27 and 28.

More particularly, the nozzle 25 and passages 27 and 28 comprise a jet pump and are designed to pump a much larger quantity of water than that leaking into the cavity 17 via passage 15. Therefore, as soon as the water level 24 reaches or overflows slightly the opening of the passage 27 the water is extracted out of the cavity 17 at a faster rate than the rate of leakage in the passage 15. As soon as the water level 24 drops below the opening of the passage 27, the helium gas and water mixture is being pumped by the jet pump. This action causes the water level 24 to stay at a more or less constant level determined by the vertical location of the opening of the passage 27. The helium gas which flows into the cavity 17 via the labyrinth passage 21 is pumped by the jet pump (25, 27, 28) at a rate which may be lower or higher than the rate of flow through the labyrinth passage 21. In case of the jet pump pumping at a higher rate than that flowing into the cavity 17, the pressure equalization line 31 allows the excess of helium flow pumped by the jet pump to flow from the separator 30 back to the cavity 17. If the jet pump pumps less flow than that flowing through the labyrinth 21, the remainder of the helium flows via the line 31 into the separator 30.

A nozzle 25 is provided projecting upwardly into the cavity 17 and terminating below the normal level 24 of liquid therein. A passage 26 communicates with the nozzle 25 from outside of the seal housing 14. A mixing throat 27 extends downwardly into the cavity 17 and is in alignment with the nozzle 25. The lower terminus of the throat 27 is approximately at the level 24. The interior of the mixing throat 27 is shaped to have a widened diffuser region 28 therein. The nozzle 25 and the mixing throat 27 together constitute the means 20 for removing fluid from the cavity 17, as will be explained.

The diffuser 28 is connected through a suitable conduit 29 to a separator system 30. A pressure equalizing line 31 connects the cavity 17 with the upper portion of the separator 30. In the case of the described embodiment, the separator 30 operates to separate the helium gas from the water in which it is entrained, as will be explained, and the conduit 18 leads back to a bearing lubricant system 33. The system 33 supplies water under pressure to the bearings, not shown, for the shaft 11, and to the space between the land 15 and the shaft 11.

Similarly, a conduit 32 is provided for conducting the separated gas back through a gas pump 34, a gas dryer 35, and a gas purification system 36, to the conduit or means 19 for injecting the gas into the passage 23. Since part of the total helium flow injected via the passage 19 flows into the reactor cavity 13, this flow is treated also by the gas dryer and purifier in a similar manner as the flow out of the separator 30. The separation system 30 may be located outside of the primary containment vessel for the reactor, since no moving parts need project from outside the reactor vessel to its interior. The pump 34, dryer 35, and purification system 36 may be the same components used to recirculate, dry and purify the gas coolant from the reactor cavity 13.

In operating the seal system of the invention, buffer gas flow, namely helium, is introduced to the passage 23 from the conduit 19 and into the annular recess 22. Part of the buffer gas then flows downwardly through the labyrinth 16 into the region 13. The remainder of the gas flows upwardly along the labyrinth 16 and into the cavity 17. Liquid flowing through the liquid land seal between the land 15 and the shaft 11 also flows into the cavity where it mixes with the buffer gas. The step in the shaft 11 just above the labyrinth 16 prevents direct fluid impingement on the labyrinth from the liquid exiting from the region between the land 15 and the shaft 11 in the event the shaft 11 is not rotating. When the shaft rotates, the liquid sprays outwardly by centrifugal force.

Similarly, a stream of liquid obtained from the system 33 is injected into the passage 26 from which it passes through the nozzle 25. Although the liquid in the cavity 17 is more or less stationary, the water exiting from the nozzle 25 effects a momentum exchange to impart kinetic energy to the stationary water, as explained earlier. The system is designed so that this momentum exchange causes the average rate of water leaving the cavity 17 to be equal to the rate of water entering the cavity. The gas entrained in the flowing liquid makes up the rest of the flow, thus making the system insensitive to variation in the water flow rate which enters the cavity 17 via the passage 15.

The previously mentioned momentum exchange, together with the size of the diffuser 28 of the mixing throat 27, are selected in accordance with known design principles to provide a sufficient pressure rise in the diffuser 28 so as to force the liquid-gas mixture through the conduit 29 to the separation system 30. The line 31 allows the remaining gas in the cavity 17 to flow freely into the separator, or from the separator to the cavity, as the various pressure characteristics of the system vary. Liquid is discharged through the conduit 18 from the separator at the same rate as it flows into the separator from the line 29. This may be achieved by a conventional water level controller installed on the separator 30.

In order to prevent liquid flow through the labyrinth 16 in the event the cavity 17 becomes totally flooded with liquid, a radially vaned centrifugal seal is provided on the shaft. This is shown by the plurality of vanes 37 distributed about the shaft 11 just below the step in its diameter. The centrifugal seal also prevents any water droplets or mist from entering the labyrinth 16 in the event of a loss of buffer pressure in the labyrinth.

Although the foregoing described seal system has been described in connection with the utilization of a single nozzle 25 and mixing throat 27, it is of course possible to utilize a plurality of nozzles and diffusers distributed circumferentially about the annular cavity 17.

The seal system of the invention has been tested and found satisfactory over a wide variety of conditions. In testing the system with three sets of nozzles and diffusers, it was possible to achieve satisfactory operation in the system when one of the nozzles was blocked.

Below appears a table setting forth a representative sampling of operational conditions found to be satisfactory in the seal system of the invention. The data in the following Table was obtained by operation of ambient temperature with a pressure differential across the water seal of 20 psi. The effect of temperature on the system of the invention is negligible.

| SHAFT SPEED | AREA RATIO OF DIFFUSER 27 | WATER PRESSURE AT LAND 15 | BUFFER GAS FLOW RATE | NOZZLE WATER FLOW RATE | WATER PRESSURE AT NOZZLE |
|---|---|---|---|---|---|
| 0 RPM | 0.25 | 15 psi | 2.24 acfm | 12 & 8.3 gpm | 20 psig |
| 2000 RPM | 0.25 | 15 psi | 2.34 acfm | 12 & 7.8 gpm | 27 psig |
| 4000 RPM | 0.25 | 15 psi | 2.33 acfm | 12 & 7.6 gpm | 26 psig |

—Continued

| SHAFT SPEED | AREA RATIO OF DIFFUSER 27 | WATER PRESSURE AT LAND 15 | BUFFER GAS FLOW RATE | NOZZLE WATER FLOW RATE | WATER PRESSURE AT NOZZLE |
|---|---|---|---|---|---|
| 0 RPM | 0.25 | 5 psi | 2.33 acfm | 12 & 7.5 gpm | 26 psig |
| 2000 RPM | 0.25 | 5 psi | 2.33 acfm | 12 & 7.5 gpm | 26 psig |
| 4000 RPM | 0.25 | 5 psi | 2.29 acfm | 12 & 7.5 gpm | 26 psig |
| 0 RPM | 0.15 | 20 psi | 2.25 acfm | 6 & 3.4 gpm | 31 psig |
| 2000 RPM | 0.15 | 20 psi | 2.25 acfm | 6 & 3.4 gpm | 32 psig |
| 4000 RPM | 0.15 | 20 psi | 2.33 acfm | 6 & 3.4 gpm | 32 psig |
| 0 RPM | 0.15 | 5 psi | 2.34 acfm | 6 & 3.6 gpm | 25 psig |
| 2000 RPM | 0.15 | 5 psi | 2.35 acfm | 6 & 3.6 gpm | 24 psig |
| 4000 RPM | 0.15 | 5 psi | 2.36 acfm | 6 & 3.6 gpm | 24 psig |
| 6400 RPM | 0.15 | 15 psi | 2.35 acfm | 6 & 3.5 gpm | 23 psig |

The foregoing data is provided by way of example only, and it is to be understood that other operation parameters may be fully effective, under some circumstances, which differ from those shown in the Table.

It may therefore be seen that the invention provides an improved seal for a shaft which extends between two regions in which different fluids are present which must be isolated from each other. The seal provides a high degree of isolation and requires no internal moving parts, therefore being a highly reliable device and being suitable for use in the interior of a pressure vessel for a nuclear reactor.

Various modifications of the invention in addition to those shown and described herein will become apparent to those skilled in the art from the foregoing description and accompanying drawing. Such modifications are intended to fall within the scope of the appended claims.

What is claimed is:

1. A seal system for a shaft which extends vertically between a first region in which a liquid is present and a second region in which a gas is present, comprising, a seal housing defining an annular land and an annular labyrinth for facing on the shaft, said land being spaced axially along the shaft above said labyrinth, said seal housing further defining an annular fluid collection cavity for communicating with the space between said land and the shaft and the space between said labyrinth and the shaft, said seal housing further defining an annular recess in said labyrinth intermediate the ends thereof, means for introducing the liquid into the space between said land and the shaft, means for introducing the gas into said annular recess, a nozzle for injecting the liquid into said cavity at a level below the level of liquid therein, said nozzle being vertically oriented to inject the liquid vertically upward, and a diffuser communicating with said cavity and aligned to receive fluid from said nozzle for removing liquid and gas entrained therein from said cavity.

2. A seal system according to claim 1 including means for producing a flow through said nozzle and diffuser sufficient to remove a greater amount of the liquid from said cavity than leaks into said cavity through the space between the shaft and said land.

* * * * *